US008176779B2

(12) United States Patent
Blomqvist

(10) Patent No.: US 8,176,779 B2
(45) Date of Patent: May 15, 2012

(54) VIBRATING MICRO-MECHANICAL SENSOR OF ANGULAR VELOCITY

(75) Inventor: Anssi Blomqvist, Helsinki (FI)

(73) Assignee: VTI Technologies Oy, Vantaa (FI)

( * ) Notice: Subject to any disclaimer, the term of this patent is extended or adjusted under 35 U.S.C. 154(b) by 437 days.

(21) Appl. No.: 12/385,655

(22) Filed: Apr. 15, 2009

(65) Prior Publication Data
US 2009/0260437 A1 Oct. 22, 2009

(30) Foreign Application Priority Data

Apr. 16, 2008 (FI) .................................... 20085314

(51) Int. Cl.
G01P 3/00 (2006.01)
(52) U.S. Cl. .................................................. 73/504.12
(58) Field of Classification Search ............... 73/504.02, 73/504.03, 504.04, 504.08, 504.12, 504.13, 73/504.14, 504.18
See application file for complete search history.

(56) References Cited

U.S. PATENT DOCUMENTS

| 5,894,091 | A | 4/1999 | Kubota |
| 6,070,463 | A | 6/2000 | Moriya et al. |
| 6,158,280 | A | 12/2000 | Nonomura et al. |
| 6,321,598 | B1 | 11/2001 | Iwaki et al. |
| 6,761,068 | B1 | 7/2004 | Schmid |
| 2001/0015101 | A1 | 8/2001 | Iwaki et al. |
| 2002/0189353 | A1 | 12/2002 | Knowles et al. |
| 2003/0183007 | A1 | 10/2003 | Willig et al. |
| 2007/0144254 | A1 | 6/2007 | Handrich |
| 2007/0220973 | A1 | 9/2007 | Acar |
| 2008/0210005 | A1* | 9/2008 | Rougeot et al. ............ 73/504.12 |
| 2010/0263446 | A1* | 10/2010 | Tamura et al. ............ 73/504.12 |

FOREIGN PATENT DOCUMENTS

EP 1 568 968 A2 8/2005
WO 2006070059 A1 7/2006

OTHER PUBLICATIONS

International Search Report for international application No. PCT/FI2009/050270 filed Apr. 8, 2009.

* cited by examiner

Primary Examiner — Eric S McCall
(74) Attorney, Agent, or Firm — Squire Sanders (US) LLP

(57) ABSTRACT

Embodiments of the invention relate to measuring devices used in measuring angular velocity and, more precisely, to vibrating micro-mechanical sensors of angular velocity. The sensor of angular velocity according to an embodiment of the invention is adapted to measure angular velocity in relation to two or three axes, and at the least two seismic masses (34-36, 52-53, 71-75) of the sensor of angular velocity are adapted to be activated into primary motion vibration by a common mode. The structure of the sensor of angular velocity according to the invention enables reliable measuring with good performance, particularly in small size vibrating micro-mechanical sensors of angular velocity.

17 Claims, 8 Drawing Sheets

VIBRATING MICRO-MECHANICAL SENSOR OF ANGULAR VELOCITY

FIELD OF THE INVENTION

The invention relates to measuring devices used in measuring angular velocity and, more precisely, to vibrating micro-mechanical sensors of angular velocity. The object of the invention is to provide an improved sensor structure enabling reliable measuring with two or three degrees of freedom and with good performance, particularly in small vibrating micro-mechanical solutions for a sensor of angular velocity.

BACKGROUND OF THE INVENTION

Measuring based on a vibrating sensor of angular velocity has proved to be a method of measuring angular velocity having a simple concept and being reliable. The principle of operation of vibrating sensors of angular velocity most often used is the so called tuning fork principle.

In a vibrating sensor of angular velocity, a certain known primary motion is produced and it is maintained in the sensor. The motion to be measured by means of the sensor is then detected as a deviation of the primary motion. In the tuning fork principle the primary motion is a vibration of two linear resonators vibrating in opposite phase.

An external angular velocity affecting the sensor in a direction perpendicular to the direction of motion of the resonators causes Coriolis forces influencing the masses in opposite directions. A Coriolis force proportional to the angular velocity is detected either directly from the masses, or the masses are connected on the same rotational axis, whereby the detection motion is angular vibration in the direction of the angular velocity axis.

Central features required of sensors of angular velocity are resistance to shaking and impact. Particularly in demanding applications, such as e.g. driving control systems in the car industry, these requirements are extremely tight. Even a sharp blow, like for instance an external impact caused by a stone, or the vibration caused by a car stereo should not influence the output of the sensor of angular velocity.

Prior art is described below with exemplifying reference to the accompanying figures, of which:

FIG. 1 shows a diagram of the functional structure of a vibrating micro-mechanical Z sensor of angular velocity according to prior art.

FIG. 2 shows a diagram of an exemplifying capacitive implementation of a vibrating micro-mechanical Z sensor of angular velocity according to prior art, and FIG. 3 shows a diagram of the functional structure of a vibrating micro-mechanical X/Y sensor of angular velocity according to prior art.

FIG. 1 shows a diagram of the functional structure of a vibrating micro-mechanical Z sensor of angular velocity according to prior art. The depicted vibrating micro-mechanical Z sensor of angular velocity according to prior art comprises a mass 1, which is supported in the X axis direction to an excitation frame 2 by means of springs 4, 5. Said excitation frame 2 is further supported in the Y axis direction to a support structure 3 by means of springs 6, 7.

In the vibrating micro-mechanical Z sensor of angular velocity according to prior art, the mass 1 in the center and the excitation frame 2 surrounding it are activated into a primary motion in the Y axis direction, which occurs by means of the springs 6, 7 supported to the support structure 3. The detection axis, in the X axis direction, formed by means of the suspension 4, 5 supporting the mass 1 to the excitation frame 2, is perpendicular to the primary motion.

When the structure vibrating in the primary motion is turned in relation to the Z axis perpendicular to the surface plane, the mass 1, which is moving in the primary motion, experiences a Coriolis force in the direction of the X axis, perpendicular to its direction of motion. Then, further, the detection springs 4, 5, in addition to damping, determine the amplitude and phase of the vibration of the generated detection motion.

FIG. 2 shows a diagram of an exemplifying capacitive implementation of a vibrating micro-mechanical Z sensor of angular velocity according to prior art. In the depicted Z sensor of angular velocity, the common primary motion of the mass 1 and the excitation frame 2 is electrostatically activated by means of activation comb structures 8, and it is detected by means of detection comb structures 9. On the other hand, the secondary motion caused by the Coriolis force is differentially detected by means of capacitive comb structures 10, 11. Such a sensor is often made differential by coupling two structures, like the one described above, to each other, whereby a structure significantly more insensitive to external mechanical interference is achieved. One such sensor solution according to prior art is described i.a. in U.S. Pat. No. 6,752,017.

FIG. 3 shows a diagram of the functional structure of a vibrating micro-mechanical X/Y sensor of angular velocity according to prior art. The principle of such a sensor solution according to prior art is described i.a. in U.S. Pat. No. 5,377,544. The depicted vibrating micro-mechanical X/Y sensor of angular velocity according to prior art comprises a rotation mass 12, which is supported at the center to a support structure 13 by means of a suspension 14, 15. The vibrating micro-mechanical X/Y sensor of angular velocity according to prior art further comprises capacitive electrodes 18 provided above or below the rotation mass 12.

In the described vibrating micro-mechanical X/Y sensor of angular velocity according to prior art, the rotation mass 12 in the center is activated into a primary motion as a rotation movement in the surface plane around the Z axis by means of electrostatic excitation comb structures 16 and primary motion detection comb structures 17. The detection in the direction of the X/Y plane, formed by means of the support 13 and the suspension 14-15, is perpendicular to the rotation axis of the primary motion.

When the depicted vibrating micro-mechanical X/Y sensor of angular velocity according to prior art is turned in relation to the X axis, the Coriolis forces generate in the rotation mass 12, in phase with its speed, a torsion moment in relation to the Y axis, which torsion moment by means of the spring 14 generates a torsion vibration in the rotation mass 12. Correspondingly, when the X/Y sensor of angular velocity is turned in relation to the Y axis, the Coriolis forces generate in the rotation mass 12, in phase with its speed, a torsion moment in relation to the X axis, which torsion moment by means of the spring 15 generates a torsion vibration in the rotation mass 12. The generated vibrations can be capacitively detected by means of the electrodes 18.

For a multitude of applications in consumer electronics, a sensor of angular velocity of extremely small size and cost efficiency is needed. Measuring in several degrees of freedom is challenging in sensors of angular velocity, since often both activation and detection in more than one degree of freedom are required. In particular, a cost effective implementation in one component for measuring angular velocity in relation to an axis in the surface plane and in relation to an axis perpendicular to the plane, has proved to be a challenge.

Cost effectiveness in sensors of angular velocity is determined, in addition to the surface area, also by the complexity of the electronics required for the element. The activation motion occurring in several degrees of freedom in the measuring resonators for different axes is perhaps the biggest single factor increasing the surface area and the complexity of the electronics.

The object of the invention is then to achieve a structure of a vibrating sensor of angular velocity suitable for a small size, by means of which angular velocity can be measured in two or three degrees of freedom utilizing a common activation motion.

SUMMARY OF THE INVENTION

The object of the invention is to provide such an improved vibrating sensor of angular velocity, which enables reliable measuring with good performance in two or three degrees of freedom, particularly in solutions of small vibrating sensors of angular velocity, which in comparison with prior art solutions is remarkably cost efficient and, at the same time, can be designed to be insensitive to coupling of external mechanical interference.

According to the invention, a vibrating micro-mechanical sensor of angular velocity is provided, which comprises at least two seismic masses suspended by means of support structures and/or spring structures, and spring structures coupling said masses to each other in such a way, that the sensor of angular velocity is adapted to measure angular velocity in relation to two or three axes by means of electrodes of said masses and/or detection comb structures coupled in connection with said masses, and that the at least two masses of the sensor of angular velocity are adapted to be activated into primary motion vibration by means of a common mode.

Preferably, said at least two seismic masses comprise at least one rotation mass. Most preferably, said at least two seismic masses comprise at least one linear mass. Preferably, the sensor of angular velocity additionally comprises at least one excitation frame structure. Further, preferably, said at least two seismic masses are supported to the excitation frame structures by means of springs. Further, preferably, the sensor of angular velocity additionally comprises excitation comb structures, which excitation comb structures are adapted to activate said at least two seismic masses into primary motion by means of a common mode signal.

Preferably, said detection comb structures are adapted to detect the primary motion differentially. Further, preferably, the rotation mass is adapted to oscillate, synchronized by the excitation frame structures, in primary motion in the surface plane around the z axis. Further, preferably, the rotation mass is adapted to couple the motions of the excitation frame structures to each other in opposite phase. Further, preferably, inside the linear masses there are spring structures connected to support structures, which spring structures prevent the motion in primary mode of the detection comb structures detecting angular velocity in the z direction.

Preferably, the electrodes are adapted to measure vibration caused by turning the sensor of angular velocity relative to the x axis. Preferably, the electrodes are adapted to measure vibration caused by turning the sensor of angular velocity in relation to the y axis. Preferably, the detection comb structures are adapted to measure vibration caused by turning the sensor of angular velocity in relation to the z axis. Preferably, the sensor of angular velocity is implemented out of wafer material of the SOI type (SOI, Silicon on Insulator). Preferably, the structure of the sensor of angular velocity is supported at support areas to a substrate and/or a cover. Preferably, the frame of the sensor component is connected to both the substrate and the cover, sealing a gas space, above the structure of the sensor of angular velocity.

BRIEF DESCRIPTION OF THE DRAWINGS

Below, the invention and its preferred embodiments are described in detail, with exemplifying reference to the appended figures, of which.

Figure 1:
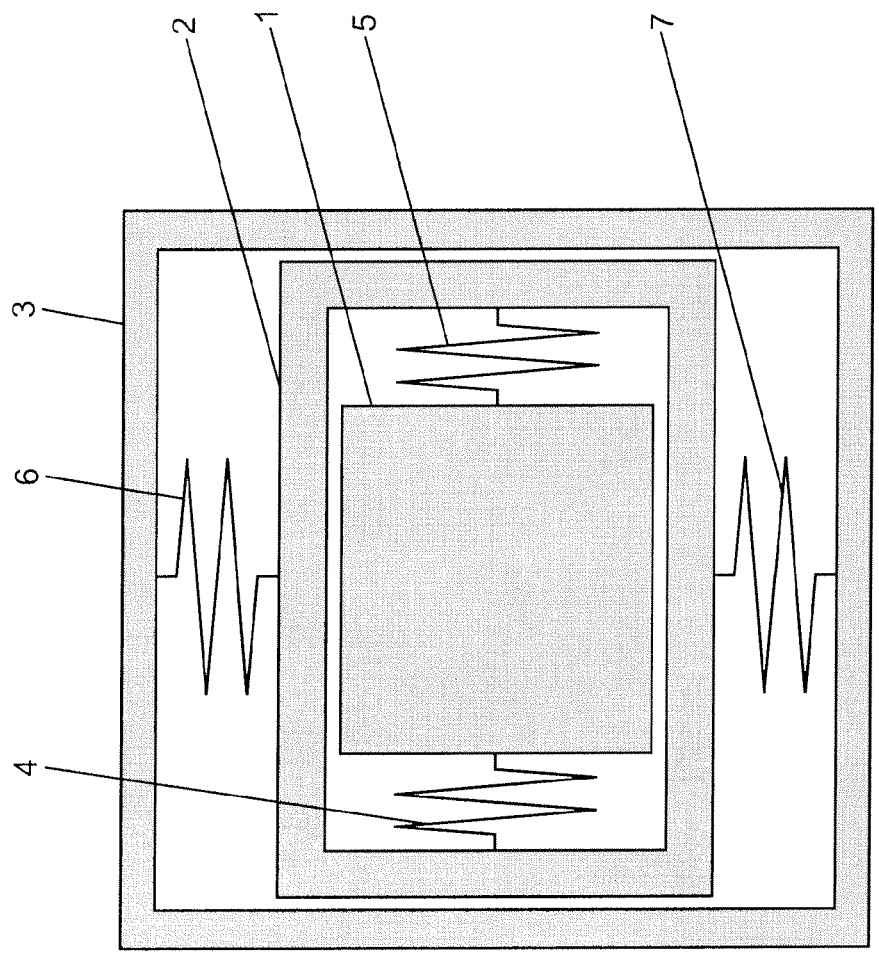
FIG. 1 shows a diagram of the functional structure of a vibrating micro-mechanical Z sensor of angular velocity according to prior art.
Figure 2:
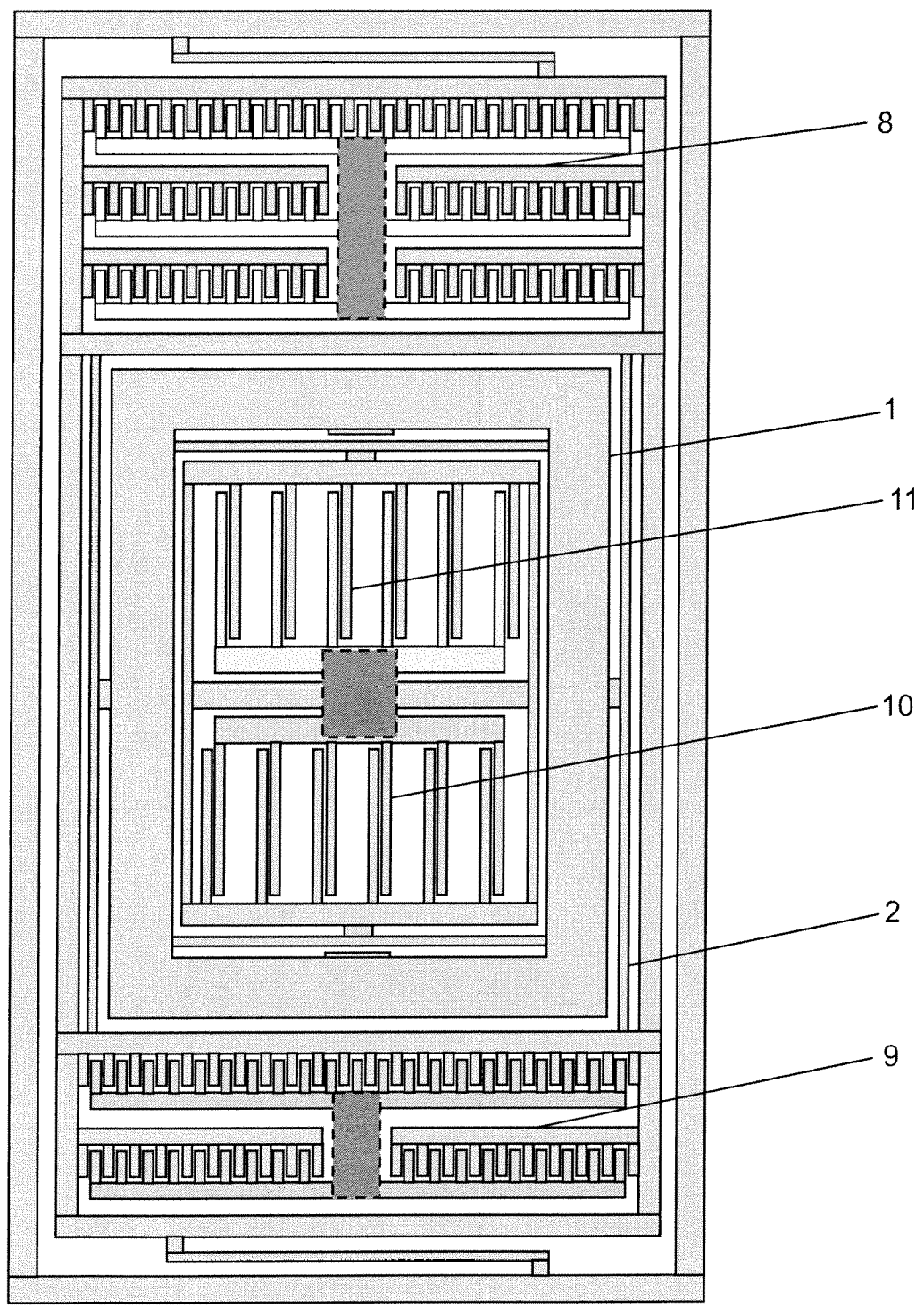
FIG. 2 shows a diagram of an exemplifying capacitive implementation of a vibrating micro-mechanical Z sensor of angular velocity according to prior art.
Figure 3:
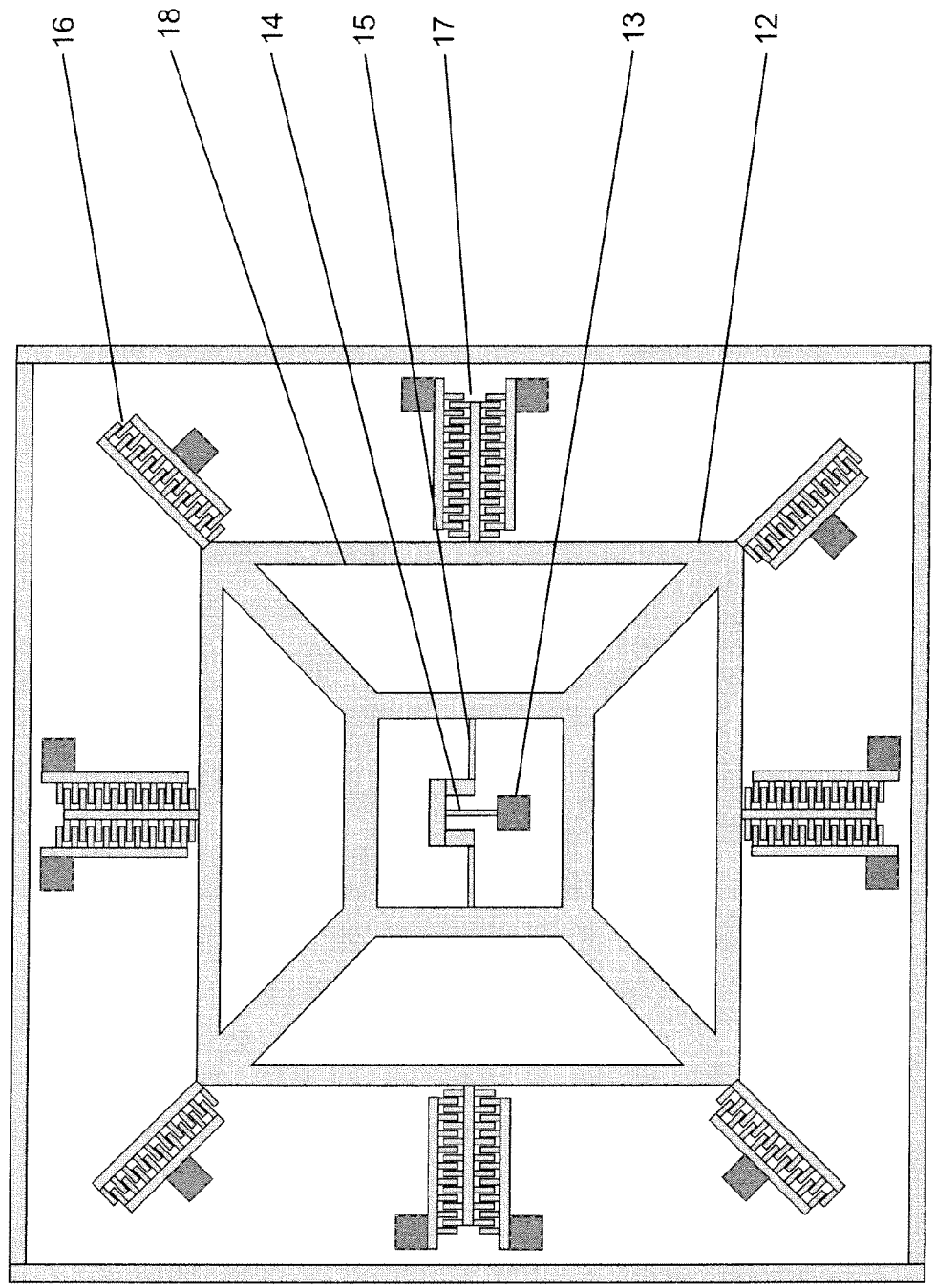
FIG. 3 shows a diagram of the functional structure of a vibrating micro-mechanical X/Y sensor of angular velocity according to prior art.

The FIGS. 1-3 are presented above. Below, the invention and its preferred embodiments are described with reference to the FIGS. 4-8.

DETAILED DESCRIPTION OF THE INVENTION

Figure 4:
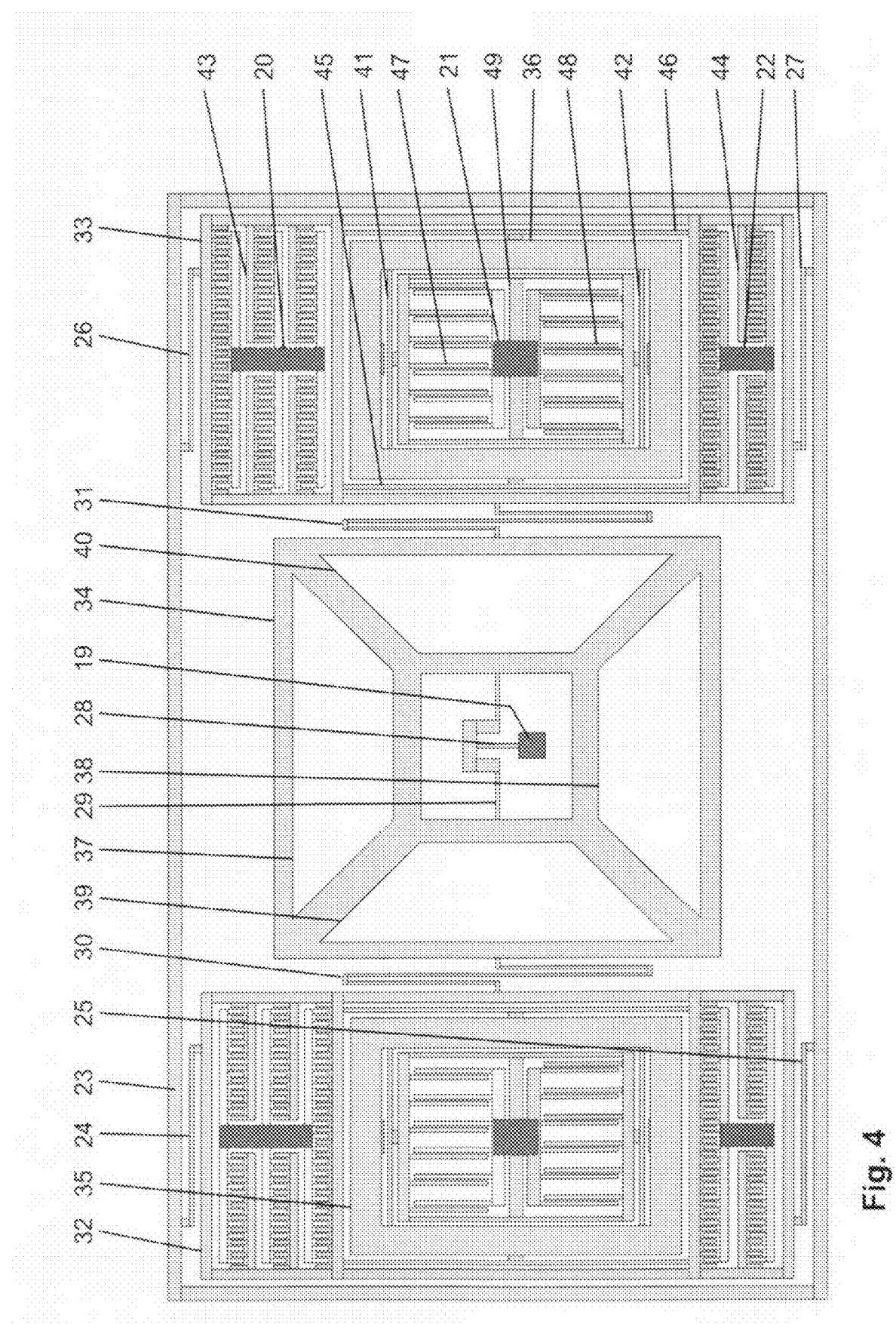
FIG. 4 shows a diagram of the functional structure of a vibrating micro-mechanical sensor of angular velocity with three axes according to the invention.

FIG. 4 shows a diagram of the functional structure of a vibrating micro-mechanical sensor of angular velocity with three axes according to the invention. The depicted vibrating micro-mechanical sensor of angular velocity with three axes according to the invention comprises a rotation mass 34, which is supported at the center to a support structure 19 by means of springs 28, 29 and supported in the X axis direction to excitation frame structures 32, 33 by means of springs 30, 31. The rotation mass 34 further comprises electrodes 37-40. Additionally, the vibrating micro-mechanical sensor of angular velocity with three axes according to the invention comprises linear masses 35, 36, which are supported in the X axis direction to the excitation frame structures 32, 33 by means of springs 45, 46. Said excitation frame structures 32, 33 are supported in the Y axis direction to a frame 23 around the edge of the sensor by means of bending springs 24-27. Additionally, the vibrating micro-mechanical sensor of angular velocity with three axes according to the invention comprises capacitive comb structures 47, 48 supported to the excitation frame structures 32, 33 by means of springs 41, 42, excitation comb structures 43 connected to the excitation comb structures 32, 33, detection frame structures 44, support springs 49 attached to the body, and support structures 20-22.

The vibrating micro-mechanical sensor of angular velocity with three axes according to the invention is particularly suitable to be implemented out of SOI type wafer material (SOI, Silicon on Insulator). In a SOI wafer, the support areas 19-22 can be attached to a substrate layer with an insulating film, such as an oxide, and at the same time the moving structures can be freed from the substrate by selectively etching the oxide off these areas.

The structure of the vibrating micro-mechanical sensor of angular velocity with three axes according to the invention is supported at the support areas 19-22 to the substrate layer of the wafer and/or to a cover wafer, sealing a gas space, above the structure, additionally also the frame structure 23 surrounding the structures is attached to both the substrate layer and the cover.

In the vibrating micro-mechanical sensor of angular velocity with three axes according to the invention the primary motion of the coupled structure is determined by the bending springs 24-27 of the linearly moving excitation frame structures 32, 33, the springs 28, 29 of the rotation mass 34, and by the springs 30, 31 coupling the masses to each other.

In the vibrating micro-mechanical sensor of angular velocity with three axes according to the invention, inside the linear masses 35, 36, there may also be spring structures 41, 42, attached to the detection comb structures 47, 48, which spring structures prevent motion in the primary mode of the detection comb structures 47, 48 detecting angular velocity in the z direction, and additionally support springs 49 attached to the body, which in turn give a degree of freedom to the detection comb structures 47, 48 in the direction of the secondary motion to be detected. Thus, also the springs 41, 42 participate in the primary motion. However, in the solution according to the invention, anchored detection comb structures 47, 48 in the z direction, according to the figure, are not a prerequisite.

In the vibrating micro-mechanical sensor of angular velocity with three axes according to the invention, the primary motion is electrostatically activated by means of the oppositely located excitation comb structures 43 by a common mode signal and it is differentially detected by the detection comb structures 44. The central rotation mass 34 oscillates, synchronized by the excitation frame structures 32, 33, in the surface plane around the z axis and, at the same time, couples the movements of the excitation frame structures 32, 33 in opposite phase in relation to each other.

When the described coupled vibrator composed of the three masses 34-36, vibrating in the surface plane of the micro-mechanical sensor of angular velocity with three axes according to the invention, are turned in relation to the x axis, a turning moment relative to the y axis is, by Coriolis forces influencing the masses 34-36, generated into the central rotation mass 34 in phase with its velocity, which generates a torsion vibration in the rotation mass 34. The magnitude and phase of the vibration of the rotation mass 34 are determined in part by the springs 28, 30, 31, giving the detection degree of freedom, which springs are dimensioned suitably soft for this mode, such that the mode resonance is at a suitable frequency, typically slightly higher than the common primary motion of the masses 34-36. The generated vibration can be capacitively and differentially detected by means of the electrodes 39, 40 on top of the rotation mass 34. These electrodes 37-40 can e.g. be deposited as a metal thin film on the internal surface of the cover wafer.

When the described coupled vibrator composed of the three masses 34-36, vibrating in the surface plane of the micro-mechanical sensor of angular velocity with three axes according to the invention, are turned in relation to the y axis, the rotation mass 34, in its turn, experiences a moment in relation to the x axis in phase with the speed, which moment generates a secondary vibration in relation to the same x axis. In this motion, the springs 29-31, on their part, are twisted in torsion mode, for their part determining the amplitude and phase of the vibration. The generated vibration can be capacitively and differentially detected by means of the electrodes 37, 38 located on top of the rotation mass 34.

When the described coupled vibrator composed of the three masses 34-36 of the micro-mechanical sensor of angular velocity with three axes according to the invention, vibrating in primary motion, are turned in relation to the z axis perpendicular to the surface plane, the linear masses 35, 36 moving in opposite directions experience Coriolis forces of opposite direction in the x axis direction. In this motion the detection springs 45, 46, 49 in the z direction, on their part, determine the amplitude and phase of the generated vibration. This detection vibration in the z direction is differentially detected by means of the capacitive comb structures 47, 48 inside the masses.

In the micro-mechanical sensor of angular velocity with three axes according to the invention, the double differential detection in the z direction is particularly insensitive to mechanical interference, since linear and angular accelerations generated by blows and shaking are being cancelled out in the differential detection.

Figure 5:
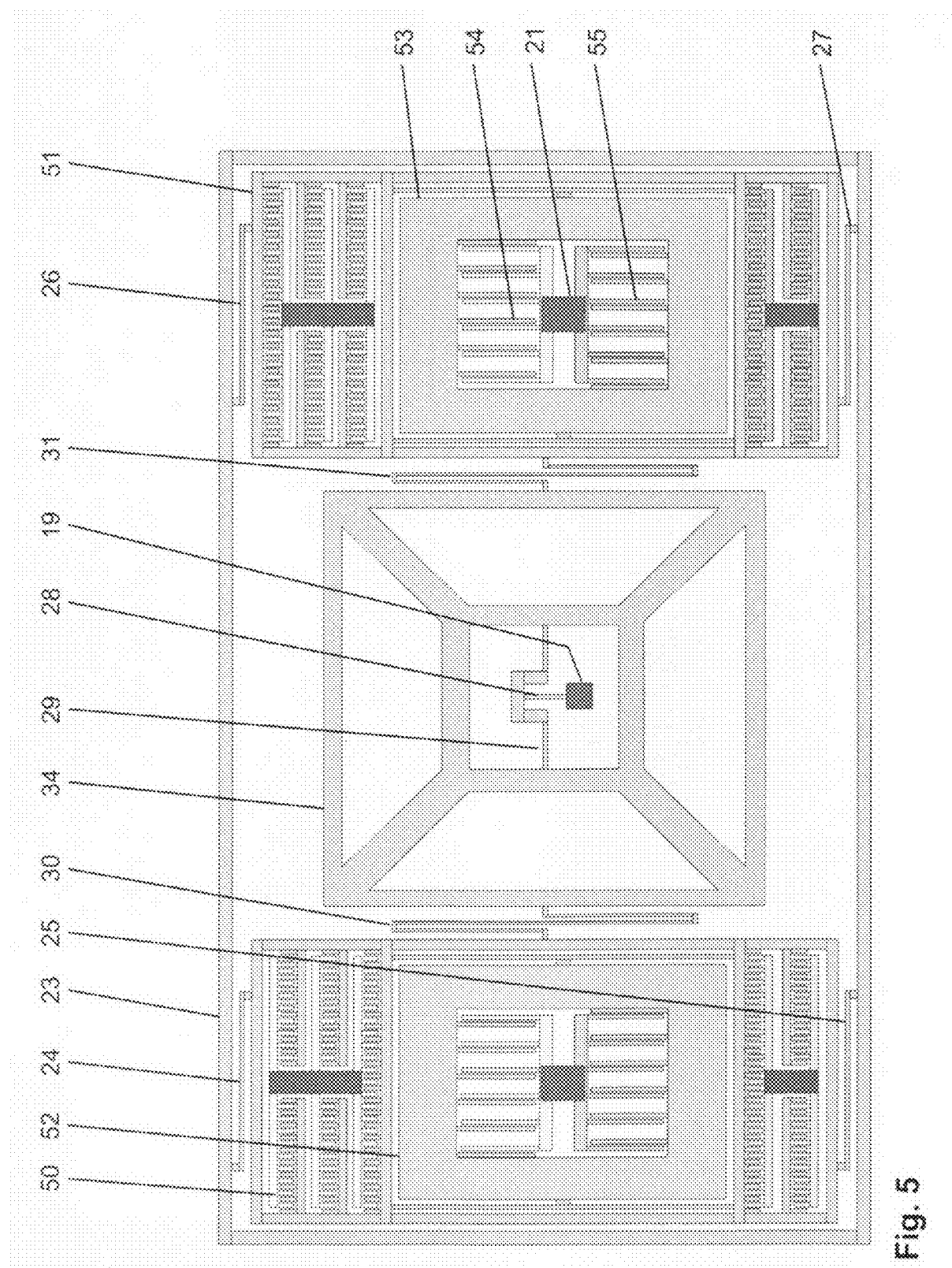
FIG. 5 shows a diagram of the functional structure of an alternative vibrating micro-mechanical sensor of angular velocity with three axes according to the invention.

FIG. 5 shows a diagram of the functional structure of an alternative vibrating micro-mechanical sensor of angular velocity with three axes according to the invention. The depicted alternative vibrating micro-mechanical sensor of angular velocity with three axes according to the invention comprises a rotation mass 34, which is supported at the center to a support structure 19 by means of springs 28, 29, and supported in the X-axis direction to excitation frame structures 50, 51 by means of springs 30, 31. The alternative vibrating micro-mechanical sensor of angular velocity with three axes according to the invention further comprises linear masses 52, 53, which are supported in the X axis direction to the excitation frame structures 50, 51 by means of springs. Said excitation frame structures 50, 51 are, by means of bending springs 24-27, supported in the Y axis direction to a frame 23 surrounding the sensor. The alternative vibrating micro-mechanical sensor of angular velocity with three axes according to the invention further comprises capacitive z direction detection comb structures 54, 55 supported to support structures 21, excitation comb structures connected to the excitation frame structures 50, 51, and detection comb structures.

The alternative vibrating micro-mechanical sensor of angular velocity with three axes according to the invention is particularly suitable to be implemented out of SOI type wafer material (SOI, Silicon on Insulator). The structure of the alternative vibrating micro-mechanical sensor of angular velocity with three axes according to the invention is supported at support areas 19, 21 to a substrate layer of the wafer an/or a cover wafer, additionally the frame structure 23 surrounding the structures is connected to both the substrate layer and to the cover wafer sealing a gas space above the structure.

In the alternative vibrating micro-mechanical sensor of angular velocity with three axes according to the invention the primary motion of the coupled structure is determined by the bending springs 24-27 of the linearly moving excitation frame structures 50, 51, the springs 28, 29 of the rotation mass 34, and the springs 30, 31 coupling the masses to each other. The rotation mass 34 in the center oscillates in the surface plane around the z axis, synchronized by the excitation frame structures 50, 51, and at the same time couples the movements of the excitation frame structures 50, 51 in opposite phase in relation to each other.

When the described coupled vibrators composed of the three masses 34, 52, 53, vibrating in the surface plane of the alternative micro-mechanical sensor of angular velocity with three axes according to the invention, are turned in relation to the x axis, a turning moment relative to the y axis is generated by Coriolis forces influencing the masses 34, 52, 53 into the central rotation mass 34 in phase with its velocity, which moment generates a torsion vibration to the rotation mass 34. The magnitude and phase of the vibration of the rotation mass 34 are determined, for their part, by the springs 28, 30, 31 giving the detection degree of freedom, which springs are dimensioned suitably soft for this mode, such that the mode resonance is at a suitable frequency, typically slightly higher than the primary motion of the masse 34. The generated vibration can be capacitively and differentially detected by means of the electrodes of the rotation mass 34.

When the described coupled vibrators composed of the three masses 34, 52, 53, vibrating in the surface plane of the alternative micro-mechanical sensor of angular velocity with three axes according to the invention, are turned in relation to the y axis, the rotation mass 34, in its turn, experiences a moment in phase with the speed in relation to the x axis, which moment generates a secondary vibration in relation to the same x axis. In this movement, the springs 29-31, in their turn, are twisted in torsion mode determining, for their part, the amplitude and phase of the vibration. The generated vibration can be capacitively and differentially detected by means of the electrodes of the rotation mass 34.

When the described coupled vibrators composed of the three masses 34, 52, 53, vibrating in the primary motion of the alternative micro-mechanical sensor of angular velocity with three axes according to the invention, are turned in relation to the z axis perpendicular to the surface plane, the linear masses 52, 53 moving in opposite directions experience opposite Coriolis forces in the x axis direction.

In the alternative micro-mechanical sensor of angular velocity with three axes according to the invention, the capacitive detection comb structures 54, 55 of the z direction inside the masses are allowed to move with the masses in the primary motion direction. In the alternative micro-mechanical sensor of angular velocity with three axes the detection vibration generated in the z direction is differentially detected by means of the capacitive comb structures 54, 55. The quadrature signal generated from the primary motion of the detection combs is cancelled out in the differential listening. The described alternative structure is less space-consuming and enables a larger signal in the same structure size.

Figure 6:
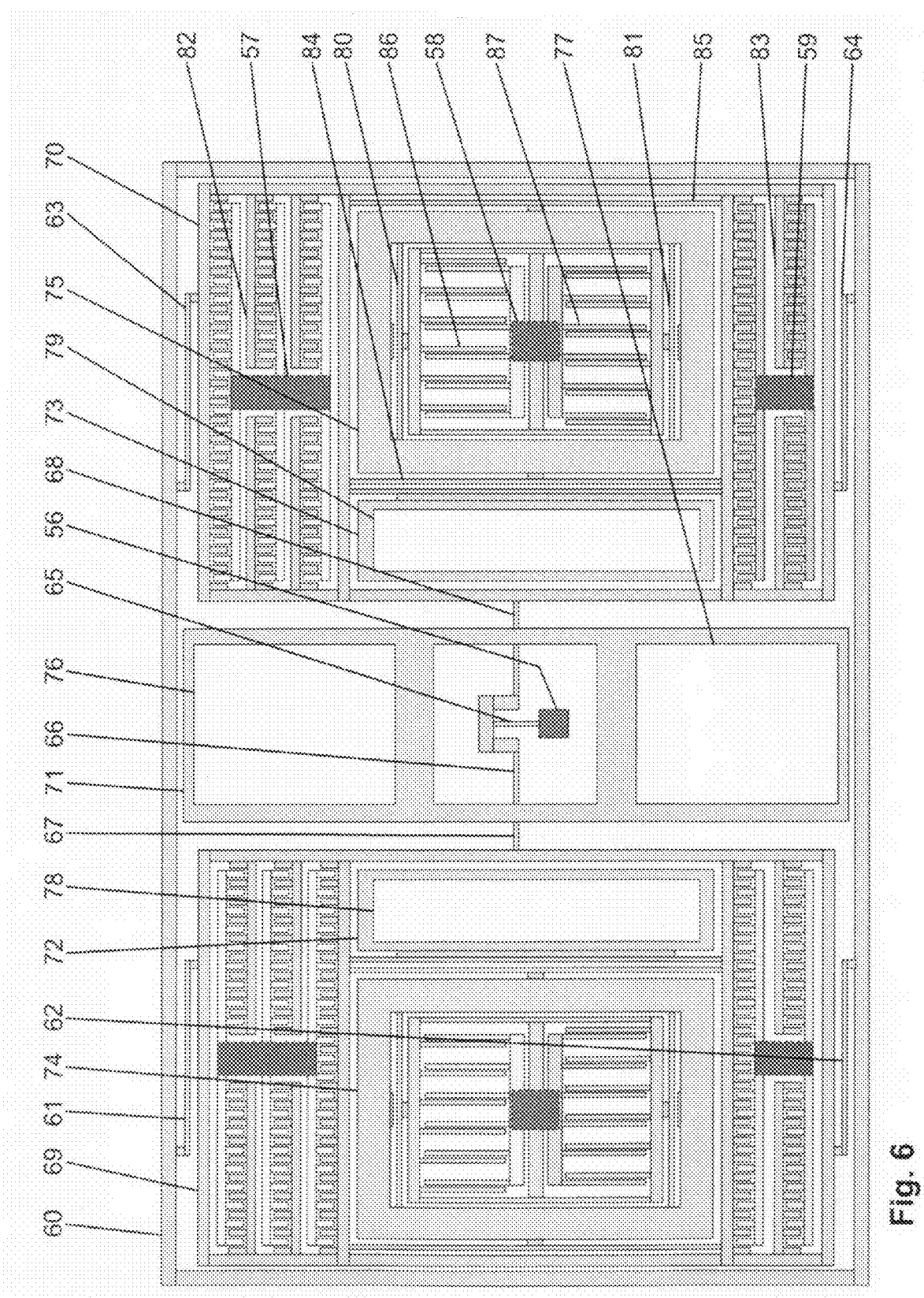
FIG. 6 shows a diagram of the functional structure of a second alternative vibrating micro-mechanical sensor of angular velocity with three axes according to the invention.

FIG. 6 shows a diagram of the functional structure of a second alternative vibrating micro-mechanical sensor of angular velocity with three axes according to the invention. The depicted second alternative vibrating micro-mechanical sensor of angular velocity with three axes according to the invention comprises a central mass 71, which is supported at the center to a support structure 56 by means of springs 65, 66 and supported in the X axis direction to excitation frame structures 69, 70 by means of springs 67, 68. The central mass 71 additionally comprises electrodes 76, 77. The depicted sensor of angular velocity with three axes additionally also comprises lateral masses 72, 73, which are supported to the excitation frame structures 69, 70 by means of springs. The lateral masses 72, 73 additionally comprise electrodes 78, 79. Further, the second alternative vibrating micro-mechanical sensor of angular velocity with three axes according to the invention comprises linear masses 74, 75, which are supported in the X axis direction to the excitation frame structures 69, 70 by means of springs 84, 85. Said excitation frame structures 69, 70 are supported in the Y axis direction to a frame structure 60 by means of bending springs 61-64. Further, the second alternative vibrating micro-mechanical sensor of angular velocity with three axes according to the invention comprises capacitive comb structures 86, 87 supported to the excitation frame structures 69, 70 by means of springs 80, 81, excitation comb structures 82 attached to the excitation frame structures 69, 70, detection comb structures 83, a support spring and support structures 57-59.

The second alternative vibrating micro-mechanical sensor of angular velocity with three axes according to the invention is particularly suitable to be implemented out of SOI type wafer material (SOI, Silicon on Insulator). The structure of the second alternative vibrating micro-mechanical sensor of angular velocity with three axes according to the invention is supported at the support areas 56-59 to a substrate layer of the wafer and/or a cover wafer, additionally the frame structure 60 surrounding the structures is also connected to both the substrate layer and to the cover wafer above the structure sealing a gas space.

In the second alternative vibrating micro-mechanical sensor of angular velocity with three axes according to the invention, the primary motion of the coupled structure is determined by the bending springs 61-64 of the linearly moving excitation frame structures 69, 70, the springs 65, 66 of the central mass 71 and the springs 67, 68 coupling the masses to each other.

In the second alternative vibrating micro-mechanical sensor of angular velocity with three axes according to the invention, inside the linear masses 74, 75 there can also be spring structures 80, 81 attached to the support structures 58, which spring structures prevent the primary mode motion of the detection comb structures 86, 87, which detect angular velocity in the z direction. Thus, these springs 80, 81 also participate in the primary motion. However, in the solution according to the invention, the anchored detection comb structures 86, 87 for the z direction according to the Figure, are not a prerequisite.

In the second alternative vibrating micro-mechanical sensor of angular velocity with three axes according to the invention, the primary motion is electrostatically activated by a common mode signal by means of the opposing excitation comb structures 82, and it is differentially detected by means of the detection comb structures 83. The central mass 71 of the sensor of angular velocity oscillates, synchronized by the excitation frame structures 69, 70, in the surface plane around the z axis and, at the same time, couples the motions of the excitation frame structures 69, 70 to each other in opposite phase.

When the vibrators composed of the five coupled masses 71-75 vibrating in the surface plane of the second alternative vibrating micro-mechanical sensor of angular velocity with three axes according to the invention, are turned in relation to the y axis, the Coriolis forces affecting the masses 71-75 generate a turning moment to the central mass 71, in phase with its speed, in relation to the x axis, which generates a torsion vibration to the central mass 71. The magnitude and phase of the vibration of the central mass 71 are determined by the springs 66, 67, 68, which give the detection degree of freedom, and which are dimensioned suitably soft for this mode such, that the resonance of the mode is at a suitable frequency, typically slightly higher then the primary motion. The generated vibration can be capacitively and differentially detected by means of the electrodes 76, 77 on top of the rotation mass 71. These electrodes 76, 77 are typically deposited on the lower surface of the cover wafer.

When the vibrators composed of the five coupled masses 71-75 vibrating in the surface plane of the second alternative micro-mechanical sensor of angular velocity with three axes according to the invention, are turned in relation to the x axis, the torsion spring suspended lateral masses 72, 73, in their turn, experience a Coriolis force in the z axis direction in phase with their speed, which force generates a torsion vibration in them in relation to the y axis of opposite phases. The generated vibration can be capacitively and differentially detected by means of the electrodes 78-79 on top of the lateral masses 72, 73.

When the vibrators composed of the five coupled masses 71-75 vibrating in the surface plane of the second alternative vibrating micro-mechanical sensor of angular velocity with three axes according to the invention, are turned in relation to the z axis perpendicular to the surface plane, the linear masses 74, 75 moving in opposite directions experience Coriolis forces in opposite directions in the x axis direction. In this motion, on their part, the detection springs 84, 85 for the z direction, for their part, determine the amplitude and phase of the generated vibration. This z direction detection vibration is detected differentially by means of the capacitive comb structures 86, 87 inside the masses. The doubly differential detection in the z direction in the second alternative vibrating micro-mechanical sensor of angular velocity with three axes according to the invention is particularly insensitive to mechanical interference, since linear and angular accelerations generated from blows and vibration are cancelled out in the differential detection. Advantages of the described second alternative structure are a more efficient use of space and a better separation of the modes of the masses.

Figure 7:
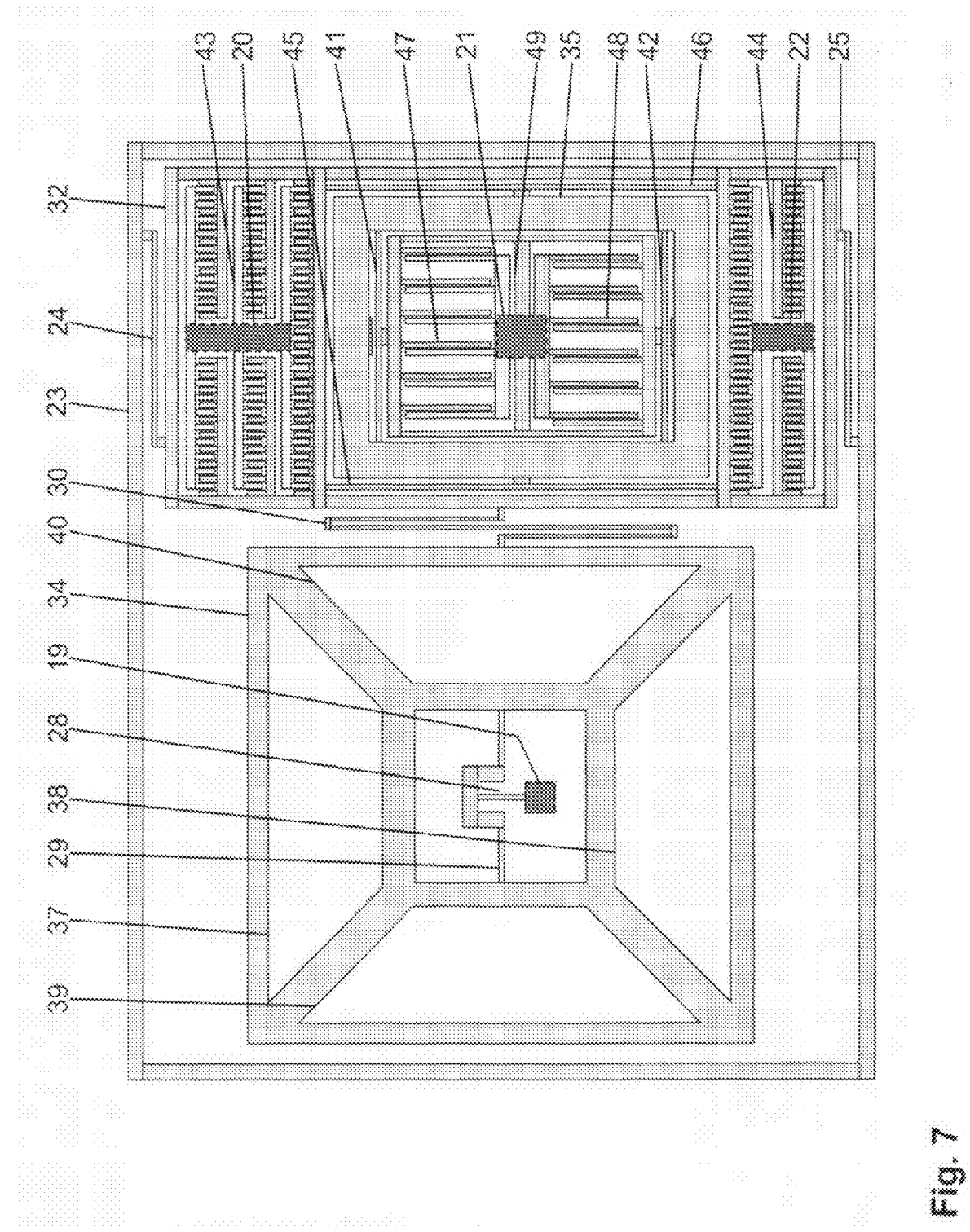
FIG. 7 shows a diagram of the functional structure of a third alternative vibrating micro-mechanical sensor of angular velocity with three axes according to the invention.

FIG. 7 shows a diagram of the functional structure of a third alternative vibrating micro-mechanical sensor of angular velocity with three axes according to the invention. The depicted third alternative vibrating micro-mechanical sensor of angular velocity with three axes according to the invention comprises a rotation mass 34, which is supported at the center to a support structure 19 by means of springs 28, 29 and supported in the X axis direction to an excitation frame structure 32 by means of a spring 30. The rotation mass 34 additionally comprises electrodes 37-40. The vibrating micro-mechanical sensor of angular velocity with three axes according to the invention further comprises a linear mass 35, which is supported in the X axis direction to the excitation frame structure 32 by means of springs 45, 46. Said excitation frame structure 32 is supported in the Y axis direction to a frame 23, forming the edge of the sensor, by means of bending springs 24, 25. Further, the vibrating micro-mechanical sensor of angular velocity with three axes according to the invention comprises capacitive comb structures 47, 48 supported to the excitation frame structure 32 by means of springs 41, 42, an excitation comb structure 43 attached to the excitation frame structure 32, a detection comb structure 44, support springs 49 attached to the body and support structures 20-22.

The vibrating micro-mechanical sensor of angular velocity with three axes according to the invention is particularly suitable to be implemented out of SOI type wafer material (SOI, Silicon on Insulator). In a SOI wafer, the support areas 19-22 can be attached to the substrate layer by means of an insulating layer, such as e.g. an oxide, and, at the same time, the moving structures can be freed from the substrate by selectively etching the oxide off these areas.

The structure of the third alternative vibrating micro-mechanical sensor of angular velocity with three axes according to the invention is supported at the support areas 19-22 to the wafer's substrate layer and/or to a cover wafer sealing a gas space, above the structure, in addition to which the frame structure 23 surrounding the structures is attached to both the substrate layer and to the cover.

In the third alternative vibrating micro-mechanical sensor of angular velocity with three axes according to the invention, the primary motion of the coupled structure is determined by the bending springs 24, of the linearly moving excitation frame structure 32, the springs 28, 29 of the rotation mass 34, and the spring 30 coupling the masses to each other.

In the third alternative vibrating micro-mechanical sensor of angular velocity with three axes according to the invention, inside the linear mass 35 there can also be spring structures 41, 42 attached to the detection comb structures 47, 48, which spring structures prevent the primary mode motion of the detection comb structures 47, 48 detecting angular velocity in the z direction, and additionally support springs 49 attached to the body, which on their part give a degree of freedom to the detection comb structures 47, 48 in the direction of the secondary motion to be detected. Thus, also the springs 41, 42 participate in the primary motion. However, in the solution according to the invention, the anchored detection comb structures 47, 48 for the z direction according to the Figure are not a prerequisite.

In the third alternative vibrating micro-mechanical sensor of angular velocity with three axes according to the invention, the primary motion is electrostatically activated by means of the excitation comb structures 43 and it is detected by means of the detection comb structures 44. The rotation mass 34, synchronized by the excitation frame structure 32, oscillates in the surface plane around the z axis.

When the depicted coupled vibrators composed of the two masses 34, 35 vibrating in the surface plane of the third alternative micro-mechanical sensor with three axes according to the invention are turned in relation to the x axis, the Coriolis forces influencing the masses 34, 35 generate a turning moment to the rotation mass 34 in phase with its speed in relation to the y axis, which moment generates a torsion vibration to the rotation mass 34. The magnitude and phase of the vibration of the rotation mass 34 are determined by the springs 28, 30, which, on their part, are giving a detection degree of freedom, which springs are dimensioned suitably soft for this mode, such that the mode resonance is at a suitable frequency, typically slightly higher than the common primary motion of the masses 34, 35. The generated vibration can be capacitively and differentially detected by means of the electrodes 39, 40 on top of the rotation mass 34. These electrodes 37-40 can, for example, be deposited as metal thin film on the inner surface of the cover wafer.

When the depicted coupled vibrators composed of the two masses 34, 35 vibrating in the surface plane of the third alternative micro-mechanical sensor with three axes according to the invention are turned in relation to the y axis, the rotation mass 34, on its part, experiences a moment in relation to the x axis in phase with its speed, which moment generates a secondary vibration in relation to the same x axis. In this motion the springs 29 and 30, on their part, are twisted in torsion mode, determining, for their part, the amplitude and phase of the vibration. The generated vibration can be capacitively and differentially detected by means of the electrodes 37, 38 on top of the rotation mass 34.

When the coupled vibrators composed of the two masses 34, 35 vibrating in the primary motion of the third alternative micro-mechanical sensor with three axes according to the invention are turned in relation to the z-axis perpendicular to the surface plane, the linearly moving mass 35 experiences a Coriolis force oscillating in phase with the speed in the x axis direction. In the generated motion, the amplitude and phase of the generated vibration are determined, for their part, by the z direction detection springs 45, 46, 49. This z direction detection vibration is differentially detected by means of the capacitive comb structures 47, 48 located inside the mass.

In the third alternative micro-mechanical sensor with three axes according to the invention, the single end detection in the z direction is particularly sensitive to mechanical interference, since even linear accelerations generated by blows and vibration will displace the mass 35. The greatest advantage of the implementation is accordingly an extremely small size and a simple, readily implemented structure.

In addition to the described exemplifying structures, a multitude of modifications of the sensor of angular velocity with three axes according to the invention can be presented within the scope of the invention.

Figure 8:
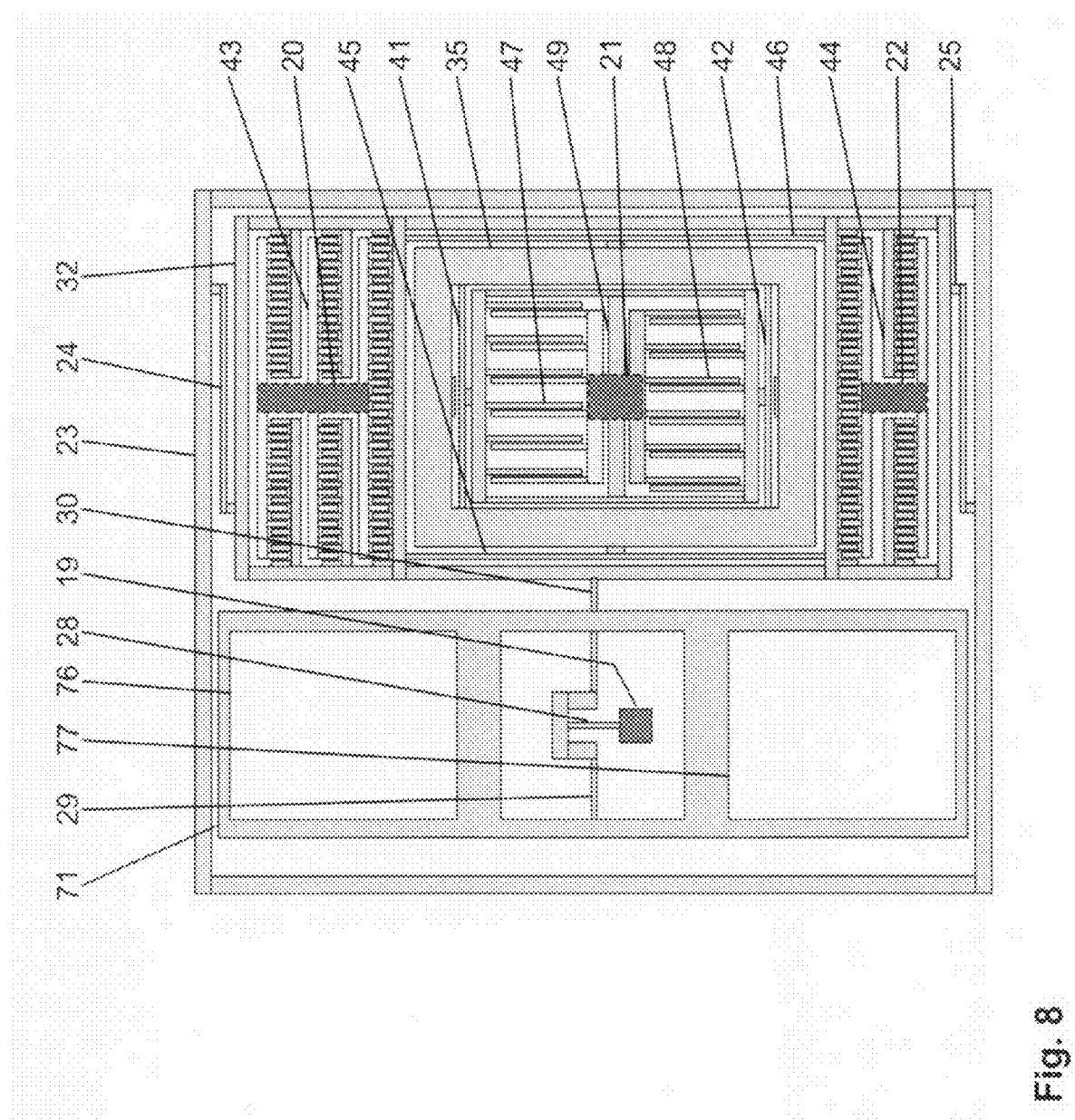
FIG. 8 shows a diagram of the functional structure of a vibrating micro-mechanical sensor of angular velocity with two axes according to the invention.

FIG. 8 shows a diagram of the functional structure of a vibrating micro-mechanical sensor of angular velocity with two axes according to the invention. The depicted vibrating micro-mechanical sensor of angular velocity with two axes according to the invention comprises a rotation mass 71, which is supported at the center to a support structure 19 by means of springs 28, 29 and supported in the X axis direction to an excitation frame structure 32 by means of a spring 30. The rotation mass 71 additionally comprises electrodes 76, 77. Further, the vibrating micro-mechanical sensor of angular velocity with two axes according to the invention comprises a linear mass 35, which is supported in the X axis direction to the excitation frame structure 32 by means of springs 45, 46. Said excitation frame structure 32 is, by means of bending springs 24, 25, supported in the Y axis direction to a frame 23 forming the edge of the sensor. Further, the vibrating micro-mechanical sensor of angular velocity with two axes according to the invention comprises capacitive comb structures 47, 48 supported to the excitation frame structure 32 by means of springs 41, 42, an excitation comb structure 43 connected to the excitation frame structure 32, a detection comb structure 44, support springs 49 attached to the body, and support structures 20-22.

The vibrating micro-mechanical sensor of angular velocity with two axes according to the invention is particularly suitable to be implemented out of SOI type wafer material (SOI, Silicon on Insulator). In a SOI wafer, the support areas 19-22 can be attached to a substrate layer with an insulating film, such as e.g. an oxide, and at the same time the moving structures can be freed from the substrate by selectively etching the oxide off these areas.

The structure of the vibrating micro-mechanical sensor of angular velocity with two axes according to the invention is supported at support areas 19-22 to the substrate layer of the wafer and/or to a cover wafer sealing a gas space above the structure, in addition to which also the frame structure 23 surrounding the structures is attached to both the substrate layer and the cover.

In the vibrating micro-mechanical sensor of angular velocity with two axes according to the invention, the primary motion of the coupled structure is determined by the bending springs 24, 25 of the linearly moving excitation frame structure 32, the springs 28, 29 of the rotation mass 71, and the spring 30 coupling the masses to each other.

In the vibrating micro-mechanical sensor of angular velocity with two axes according to the invention, there may also be spring structures 41, 42 attached to detection comb structures 47, 48 inside the linear mass 35, which spring structures prevent motion in the primary mode of the detection comb structures 47, 48 detecting angular velocity in the z direction, and also support springs 49 attached to the body, which springs, for their part, give a degree of freedom to the detection comb structures 47, 48 in the direction of the secondary motion to be detected. Thus also the springs 41, 42 participate in the primary motion. However, in the solution according to the invention, the anchored detection comb structures 47, 48 for the z direction according to the Figure are not a prerequisite.

In the vibrating micro-mechanical sensor of angular velocity with two axes according to the invention, the primary motion is electrostatically activated by means of the excitation comb structures 43 and it is detected by means of the detection comb structures 44. The rotation mass 71 oscillates, synchronized by the excitation frame structure 32, in the surface plane around the z axis.

When the depicted coupled vibrators composed of the two masses 35, 71 vibrating in the surface plane of the micro-mechanical sensor of angular velocity with two axes according to the invention are turned in relation to the y axis, the Coriolis forces influencing the masses 35, 71 generate a turning moment in relation to the x axis in the rotation mass 71 in phase with its speed, which moment generates a torsion vibration in the rotation mass 71. The magnitude and phase of the vibration of the rotation mass 71 are determined, for their part, by the springs 29, 30 giving a detection degree of freedom, which springs are dimensioned suitably soft for this mode, such that the resonance of the mode is at a suitable frequency, typically slightly higher than the common primary motion of the masses 35, 71. The generated vibration can be capacitively and differentially detected by means of the electrodes 76, 77 on top of the rotation mass 71. These electrodes can e.g. be deposited as metal thin film on the internal surface of the cover wafer.

When the depicted coupled vibrators composed of the two masses 35, 71 vibrating in the primary motion of the micro-mechanical sensor of angular velocity with two axes according to the invention are turned in relation to the z axis perpendicular to the surface plane, the linearly moving mass 35 experiences a Coriolis force oscillating in phase with the speed in the x axis direction. In the generated motion, the detection springs 45, 46, 49, for their part, determine the amplitude and phase of the generated vibration. This detection vibration in the z direction is differentially detected by means of the capacitive comb structures 47, 48 located inside the mass.

In the micro-mechanical sensor of angular velocity with two axes according to the invention, the single end detection in the z direction is particularly sensitive to mechanical interference, since even linear accelerations generated from blows and vibration will displace the mass 35. The greatest advantage of the implementation is correspondingly an extremely small size and a simple structure, which is easily implemented.

In addition to the described exemplifying structures, a multitude of modifications of the sensor of angular velocity with two axes according to the invention can be presented within the scope of the invention.

In the vibrating micro-mechanical sensor of angular velocity according to the invention, the most significant advantage in comparison with sensor structures according to prior art is a remarkably cost effective structure due to the primary motion with several degrees of freedom of the coupled masses. At the same time, due to the differential detection, the sensor can be designed to be insensitive to coupling to external mechanical interference.

The vibrating sensor of angular velocity according to the invention also enables an extremely large signal level due to exactly considered directions of motion. For example, the large size and moment of inertia of the rotation mass can be efficiently utilized by means of large electrodes positioned underneath or on top of the mass.

I claim:

1. A vibrating micro-mechanical sensor of angular velocity, comprising:
    at least two seismic masses suspended by support structures and/or spring structures; and
    spring structures coupling said at least two seismic masses to each other,
    wherein the sensor of angular velocity is configured to measure angular velocity in relation to two or three axes by means of electrodes of said at least two seismic masses and/or detection comb structures attached in connection with said at least two seismic masses, and
    wherein the at least two seismic masses of the sensor of angular velocity are configured to be activated into a primary motion vibration by means of a common vibration mode, and wherein the at least two seismic masses comprise at least one rotation mass.

2. The sensor of angular velocity according to claim 1, wherein said at least two seismic masses comprise at least one linear mass.

3. The sensor of angular velocity according to claim 1, wherein said detection comb structures are configured to differentially detect the primary motion.

4. The sensor of angular velocity according to claim 1, wherein the electrodes are configured to measure the vibration caused by turning the sensor of angular velocity in relation to the x axis.

5. The sensor of angular velocity according to claim 1, wherein the electrodes are configured to measure the vibration caused by turning the sensor of angular velocity in relation to the y axis.

6. The sensor of angular velocity according to claim 1, wherein the sensor of angular velocity is implemented out of wafer material of the silicon on insulator (SOI) type.

7. The sensor of angular velocity according to claim 1, wherein the structure of the sensor of angular velocity is supported at support areas to a substrate and/or a cover.

8. The sensor of angular velocity according to claim 7, wherein a frame of the sensor of angular velocity is attached to both the substrate and the cover above the structure of the sensor of angular velocity.

9. The sensor of angular velocity according to claim 1, further comprises at least one excitation frame structure.

10. The sensor of angular velocity according to claim 9, wherein said at least two seismic masses are supported to excitation frame structures by means of springs.

11. The sensor of angular velocity according to claim 9, further comprising excitation comb structures configured to activate said at least two seismic masses into primary motion by means of a common mode signal.

12. The sensor of angular velocity according to claim 9, wherein the rotation mass is configured to oscillate, synchronized by the excitation frame structures, in primary motion in the surface plane around the z axis.

13. The sensor of angular velocity according to claim 9, wherein the rotation mass is configured to couple the motions of the excitation frame structures to each other in opposite phase.

14. A vibrating micro-mechanical sensor of angular velocity, comprising:
    at least two seismic masses suspended by support structures and/or spring structures; and
    spring structures coupling said at least two seismic masses to each other,
    wherein the sensor of angular velocity is configured to measure angular velocity in relation to two or three axes by means of electrodes of said at least two seismic masses and/or detection comb structures attached in connection with said at least two seismic masses, and
    wherein the at least two seismic masses of the sensor of angular velocity are configured to be activated into a primary motion vibration by means of a common mode,
    wherein said at least two seismic masses comprise at least one linear mass,
    wherein, inside the linear masses, there are spring structures attached to support structures, wherein the spring structures prevent the motion in primary mode of the detection comb structures detecting angular velocity in the z direction.

15. The vibrating micro-mechanical sensor of angular velocity according to claim 14, further comprising excitation comb structures configured to activate said at least two seismic masses into primary motion by means of a common mode signal.

16. A vibrating micro-mechanical sensor of angular velocity, comprising:
    at least two seismic masses suspended by support structures and/or spring structures; and
    spring structures coupling said at least two seismic masses to each other,
    wherein the sensor of angular velocity is configured to measure angular velocity in relation to two or three axes by means of electrodes of said at least two seismic masses and/or detection comb structures attached in connection with said at least two seismic masses, and
    wherein the at least two seismic masses of the sensor of angular velocity are configured to be activated into a primary motion vibration by means of a common mode,
    wherein the detection comb structures are configured to measure the vibration caused by turning the sensor of angular velocity in relation to the z axis.

17. The vibrating micro-mechanical sensor of angular velocity according to claim 16, further comprising excitation comb structures configured to activate said at least two seismic masses into primary motion by means of a common mode signal.

* * * * *